(12) United States Patent
Kipker et al.

(10) Patent No.: US 8,317,235 B2
(45) Date of Patent: Nov. 27, 2012

(54) FLANGE CLEAT AND METHOD

(75) Inventors: Eric Kipker, Holland, MI (US); Clark Pridemore, Grand Rapids, MI (US); Michael Lutz, Allendale, MI (US); Alexander M. Prociv, Kentwood, MI (US); Tiburcio Hernandez, Jr., Holland, MI (US); Justin Johnston, Grand Rapids, MI (US)

(73) Assignee: Hart & Cooley, Inc., Grand Rapids, MI (US)

( * ) Notice: Subject to any disclaimer, the term of this patent is extended or adjusted under 35 U.S.C. 154(b) by 94 days.

(21) Appl. No.: 13/027,352

(22) Filed: Feb. 15, 2011

(65) Prior Publication Data

US 2012/0204386 A1 Aug. 16, 2012

(51) Int. Cl.
*F16L 35/00* (2006.01)
(52) U.S. Cl. ..... 285/424; 285/406; 29/243.5; 29/243.56
(58) Field of Classification Search ................. 285/424, 285/406; 29/243.56, 243.5
See application file for complete search history.

(56) References Cited

U.S. PATENT DOCUMENTS

| | | | |
|---|---|---|---|
| 1,826,133 A * | 10/1931 | Hatch | 52/772 |
| 3,091,487 A | 5/1963 | Gallagher et al. | |
| 3,630,549 A | 12/1971 | Grimm | |
| 4,252,350 A | 2/1981 | Smitka | |
| 4,288,115 A | 9/1981 | Sullivan | |
| 4,351,390 A * | 9/1982 | Argyle et al. | 285/364 |
| 4,447,079 A * | 5/1984 | Sullivan | 285/424 |
| 4,466,641 A * | 8/1984 | Heilman et al. | 285/424 |
| 4,558,892 A * | 12/1985 | Daw et al. | 285/424 |
| 4,566,724 A | 1/1986 | Arnoldt et al. | |
| 4,579,375 A * | 4/1986 | Fischer et al. | 285/424 |
| 4,617,772 A * | 10/1986 | Hassell | 52/461 |
| 4,995,648 A * | 2/1991 | Jackson | 285/424 |
| 5,015,018 A | 5/1991 | Arnoldt | |
| 5,020,202 A * | 6/1991 | Turrell | 29/243.56 |
| 5,104,159 A * | 4/1992 | Sugiyama et al. | 285/424 |
| 5,275,449 A * | 1/1994 | Hunter | 285/424 |
| 5,352,000 A * | 10/1994 | Issagholian-Havai et al. | 285/424 |
| 5,661,886 A * | 9/1997 | Smith | 29/243.56 |
| 5,794,322 A * | 8/1998 | Issagholian-Havai | 285/424 |
| 7,073,826 B2 | 7/2006 | Meinig | |

* cited by examiner

*Primary Examiner* — David E Bochna
(74) *Attorney, Agent, or Firm* — J. A. Thurnau, Esq.; P. N. Dunlap, Esq.

(57) ABSTRACT

A flange cleat comprising a body having a first flange receiving portion and an immediately adjacent second flange receiving portion, a third flange receiving portion cooperatively disposed on the body opposite from the first flange receiving portion and the second flange receiving portion, the body having an elongate portion that extends from the third flange receiving portion, a flexible tab projecting from the elongate portion whereby the flexible tab can be depressed during installation, and the body being resiliently expandable during installation.

3 Claims, 2 Drawing Sheets

FLANGE CLEAT AND METHOD

FIELD OF THE INVENTION

The invention relates to a flange cleat and method, and more particularly to a flange cleat comprising a body having a first flange receiving portion and an adjacent second flange receiving portion, a third flange receiving portion disposed on the body and cooperatively opposite from the first flange receiving portion and the second flange receiving portion, the body having an elongate portion that extends from the third flange receiving portion, the body resiliently expandable such that a gap between the first flange receiving portion and the third flange receiving portion may be temporarily increased during installation.

BACKGROUND OF THE INVENTION

Square or rectangular commercial ductwork is typically installed with flanges on each end. Typically, at each corner of the ductwork is a corner bracket. Between the flanges and the corner bracket is a continuous gasket that forms an air tight seal between each ductwork flange. The corner brackets are fastened with bolts and nuts.

An assembly method is a pressure seal at the corners but the larger the ductwork the farther the bolts are apart and therefore the less clamping pressure is available to maintain an air tight seal throughout the entire connection. To keep the gasket in place and to maintain an air tight seal along the entire length of the flange a metal cleat (clip) is used. The cleat acts like a c-clamp to maintain clamping pressure on both flanges between the bolted corner brackets.

The ductwork flanges are either integral or manufactured by a third party and attached to the ductwork at the job site or at the fabricator's business location. There are no standard dimensions for the height or width of the flanges. Therefore wholesalers must inventory a number of different cleats to accommodate the different flange designs.

Representative of the art is U.S. Pat. No. 4,288,115 which discloses a means for connecting together sheet metal ducts, e.g. forced air heating ducts, in end-to-end relationship, comprises hollow, roll formed flange members which extend along the edges of adjacent duct ends, and L-shaped corner pieces the limbs of which can be inserted into the ends of the flange members to complete the joint at the corners. A sealing agent or gasket is located between sets of flange members and corner pieces. The flange members have planar side end surfaces for sealing reception of the gasket, and lower protuberances, into which the ends of the metal ducts fit, the protuberances being arranged to bite into the gasket to improve the seal. The corner pieces have laterally offset portions, allowing the raw edge of the duct, at the corners, to project forwardly of the side surface of the corner piece, and hence to bite into the gasket at the corners to improve the seal. Channel shaped cleats are provided to assist in the attachment of pairs of profiles on adjacent end arranged ducts. Bolt holes are provided through the corner pieces for the primary attachment means.

What is needed is a flange cleat comprising a first flange receiving portion and a second flange receiving portion, each cooperatively disposed opposite a third flange receiving portion to engage a duct flange. The present invention meets this need.

SUMMARY OF THE INVENTION

The primary aspect of the invention is a flange cleat comprising a first flange receiving portion and a second flange receiving portion, each cooperatively disposed opposite a third flange receiving portion to engage a duct flange.

Other aspects of the invention will be pointed out or made obvious by the following description of the invention and the accompanying drawings.

The invention comprises a flange cleat comprising a body having a first flange receiving portion and an immediately adjacent second flange receiving portion, a third flange receiving portion cooperatively disposed on the body opposite from the first flange receiving portion and the second flange receiving portion, the body having an elongate portion that extends from the third flange receiving portion, a flexible tab projecting from the elongate portion whereby the flexible tab can be depressed during installation, and the body being resiliently expandable during installation.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
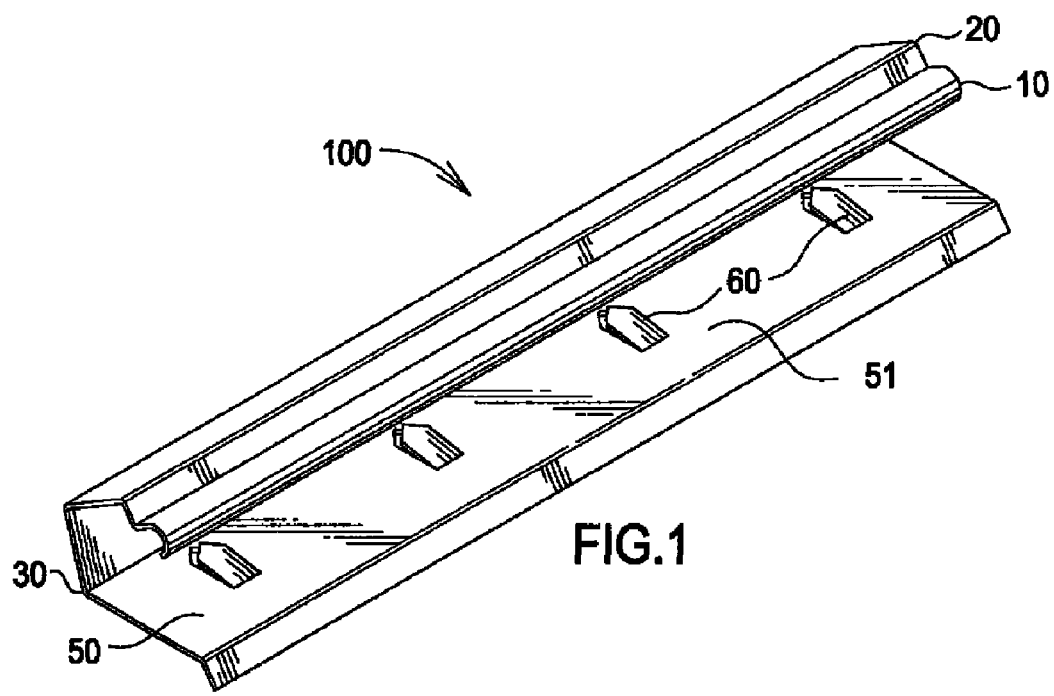
FIG. 1 is a perspective view of the cleat.

FIG. 1 is a perspective view of the cleat. Cleat 100 comprises a first flange receiving portion 10, a second flange receiving portion 20 and a third flange receiving portion 30. The first, second and third flange receiving portions are disposed on a resiliently expandable body 40.

An elongate portion 50 extends from the third flange receiving portion 30.

Third flange receiving portion 30 is cooperatively disposed opposite the first flange receiving portion 10 and the second flange receiving portion 20. The distance between the first flange receiving portion 10 and the third flange receiving portion 30 is not equal to the distance between the second flange receiving portion 20 and the third flange receiving portion 30. This allows the cleat to be used on different duct flange systems with equal success.

A plurality of spring loaded flexible tabs 60 project from a surface 51 of the elongate portion 50 in an installation direction. During installation of the cleat tabs 60 are pressed toward the surface 51 and resiliently return to a projecting position upon passage of the flange to create an interference to prevent removal of the cleat, thereby allowing a flange (see FIG. 6) to move into and be retained in the third flange receiving portion 30. The tabs extend in a longitudinal direction along the major axis length of the elongate portion 50. The tabs prevent the cleat from being withdrawn from the flange once installed.

Figure 2:
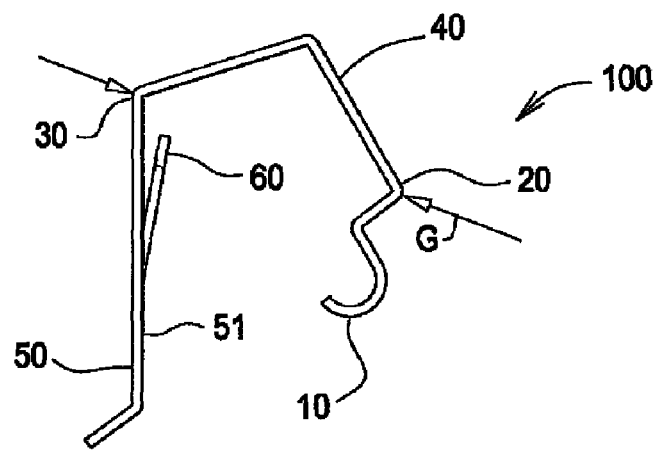
FIG. 2 is an end view of the cleat.

FIG. 2 is an end view of the cleat. In this FIG. 2 the spring loaded nature of the cleat can be appreciated. The gap (G) between first flange receiving portion and the third flange receiving portion is expandable in order to receive the duct flange.

Figure 3:
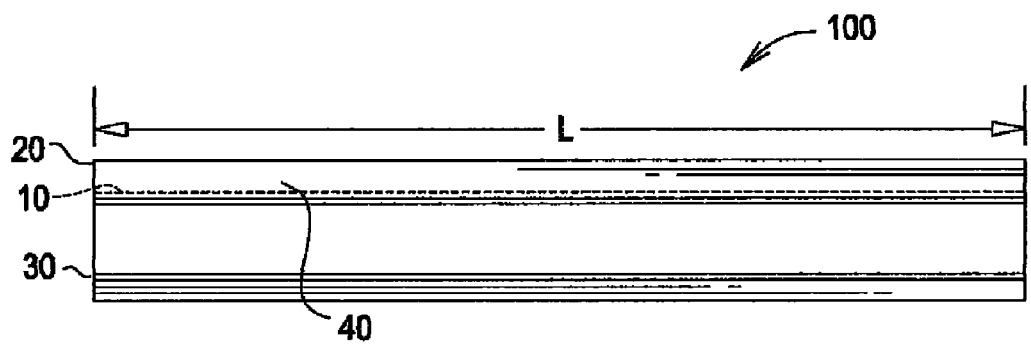
FIG. 3 is a bottom plan view of the cleat.

FIG. 3 is a bottom plan view of the cleat. Cleat 100 has a length (L).

Figure 4:
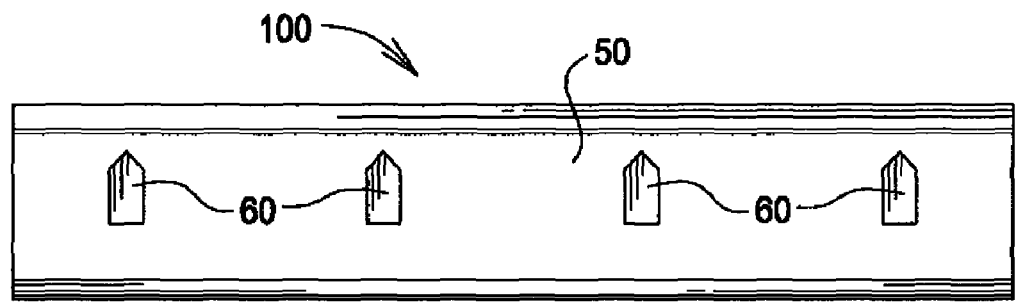
FIG. 4 is a front elevation view of the cleat.

FIG. 4 is a front elevation view of the cleat. Tabs 60 are punched from elongate portion 50.

Figure 5:
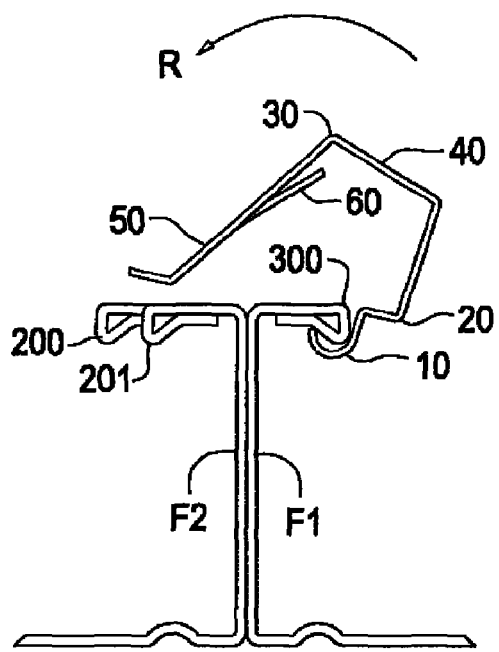
FIG. 5 is an end view of the first assembly step for the cleat.

FIG. 5 is an end view of the first assembly step for the cleat. Flanges F1 and F2 are butted back to back in the assembled position. The edge 300 of flange F1 is engaged with the first flange receiving portion 10. The cleat is then rotated (R) so that elongate portion 50 contacts flange F2. The cleat rotates about a center of rotation which is the first flange receiving portion 10.

Either flange F1 or F2 may comprise different sizes and widths as represented by edge 200 and 201. The inventive cleat will accommodate a variety of flange sizes and widths making it widely applicable to many duct designs.

Figure 6:
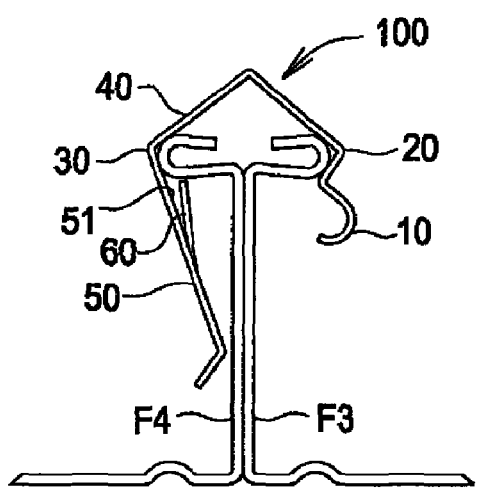
FIG. 6 is an end view of the final assembly position for the cleat.

FIG. 6 is an end view of the final assembly position for the cleat. The cleat is rotated as elongate portion 50 slides along the edge 200 of flange F2 until the flange edge 200 engages the third flange receiving portion 30. During installation tabs 60 are depressed as the cleat moves across flange 201. Once in place the tabs 60 rebound to the position shown thereby creating a mechanical interference against removal of the cleat. Following this, the cleat can remain in the described first position. Alternatively, depending on the width of the flanges being joined, for example flange 201, flange edge 100 can be engaged with the second flange receiving portion 20 during installation as shown, instead of the first flange receiving portion 10.

Due to the use of the adjacent first flange receiving portion 10 and the second flange receiving portion 20, a wide range of flange widths and sizes can be accommodated by the inventive cleat. In a typical installation a plurality of cleats are installed on each linear duct flange portion. Each cleat possesses a spring rate sufficient to prevent the joined duct pieces from pulling apart during operation.

The cleat is comprised of bent sheet metal, preferably in the range of 16 gage to 26 gage, although any suitable gage or thickness may be chosen depending on the conditions of use and the size of the duct being joined.

Although a form of the invention has been described herein, it will be obvious to those skilled in the art that variations may be made in the construction and relation of parts without departing from the spirit and scope of the invention described herein.

We claim:

1. A flange cleat comprising:
    a body having a first flange receiving portion and an immediately adjacent second flange receiving portion;
    a third flange receiving portion cooperatively disposed on the body opposite from the first flange receiving portion and the second flange receiving portion;
    the body having an elongate portion that extends from the third flange receiving portion;
    a flexible tab projecting from the elongate portion whereby the flexible tab can be depressed during installation; and
    the body being resiliently expandable during installation.

2. The flange cleat as in claim 1 further comprising a plurality of flexible tabs disposed in a longitudinal direction on the elongate portion.

3. A method of installing a duct comprising:
    engaging a flange cleat first flange receiving portion or a flange cleat second flange receiving portion with a first duct flange;
    engaging a flange cleat elongate portion with a second duct flange;
    urgingly sliding the flange cleat toward the second duct flange along the flange cleat elongate portion whereby a third flange receiving portion engagingly receives the second duct flange; and
    depressing a tab disposed on the flange cleat elongate portion by a sliding passage of the second duct flange.

* * * * *